United States Patent
Spath

(10) Patent No.: US 8,454,283 B2
(45) Date of Patent: Jun. 4, 2013

(54) MOTOR-DRIVEN WORKING SPINDLE FOR A MACHINE TOOL

(75) Inventor: Gunther Spath, Kornwestheim (DE)

(73) Assignee: MAG IAS, GmbH, Goppingen (DE)

( * ) Notice: Subject to any disclaimer, the term of this patent is extended or adjusted under 35 U.S.C. 154(b) by 880 days.

(21) Appl. No.: 12/599,147

(22) PCT Filed: May 3, 2008

(86) PCT No.: PCT/EP2008/003571
§ 371 (c)(1),
(2), (4) Date: Nov. 6, 2009

(87) PCT Pub. No.: WO2008/138505
PCT Pub. Date: Nov. 20, 2008

(65) Prior Publication Data
US 2010/0303571 A1    Dec. 2, 2010

(30) Foreign Application Priority Data

May 15, 2007 (EP) .................................. 07009683

(51) Int. Cl.
*B23C 5/26* (2006.01)
(52) U.S. Cl.
USPC ............ 409/233; 409/185; 409/231; 408/237
(58) Field of Classification Search
USPC .............. 409/233, 231, 232, 185; 408/239 R, 408/239 A, 137–138; 173/213, 4, 165, 163, 173/141, 152, 217
See application file for complete search history.

(56) References Cited

U.S. PATENT DOCUMENTS

| | | | |
|---|---|---|---|
| 4,607,180 | A | 8/1986 | Stoody |
| 5,100,271 | A | 3/1992 | Kameyama et al. |
| 5,350,263 | A * | 9/1994 | Fedeli ........................... 409/231 |
| 5,783,887 | A | 7/1998 | Ueyama et al. |
| 6,777,834 | B2 | 8/2004 | Wittenstein et al. |
| 7,547,169 | B1 * | 6/2009 | Zagar et al. ................... 409/233 |
| 2004/0228697 | A1 * | 11/2004 | Herla ............................ 409/231 |
| 2005/0236169 | A1 | 10/2005 | Xiao |

FOREIGN PATENT DOCUMENTS

| | | |
|---|---|---|
| DE | 35 46 439 | 11/1986 |
| DE | 3910083 A1 | 10/1989 |
| DE | 196 29 991 | 1/1998 |
| DE | 299 19 604 | 1/2000 |
| DE | 10025351 A1 | 11/2001 |
| DE | 10101095 A1 * | 7/2002 |
| DE | 69901093 T2 | 12/2002 |
| DE | 10213689 A1 | 10/2003 |
| DE | 103 16 244 | 7/2004 |
| EP | 1036619 A1 | 9/2000 |

OTHER PUBLICATIONS

Machine Translation of DE 3546439, which DE '439 was published Nov. 1986.*

* cited by examiner

*Primary Examiner* — Erica E Cadugan
(74) *Attorney, Agent, or Firm* — Reising Ethington P.C.

(57) ABSTRACT

A motor-driven working spindle for a machine tool has a casing in which a shaft is mounted for rotation. The shaft has a receptacle for a tool arranged at its front end. A spindle rotary drive is provided in the casing. Furthermore, a spindle advancing drive coupled with the shaft is provided in the casing.

9 Claims, 4 Drawing Sheets

MOTOR-DRIVEN WORKING SPINDLE FOR A MACHINE TOOL

This patent claims the benefit of the filing date of the following International Application No. PCT/EP2008/003571 filed May 3, 2008 and European Application 07 009 683.9 filed May 15, 2007.

BACKGROUND OF THE INVENTION

1. Field of the Invention

The invention relates to a motor-driven working spindle for a machine tool comprising a casing with a central longitudinal axis, a shaft which is mounted for rotation in the casing, a receptacle arranged on a front end of the shaft, an electromotive spindle rotary drive which is coupled to the shaft and is arranged in the casing, the spindle rotary drive comprising a first stator and a first rotor, wherein the first stator surrounding the shaft is mounted in the casing and wherein the first rotor is fastened to the shaft.

2. Background Art

In such a motor-driven working spindle for a machine tool known from US 2005/0236169 A1 the casing mounting the shaft and its spindle-rotary-drive is arranged displaceably on guiding columns. The advancing drive of the entire casing is performed by means of a drive, which is connected in a stationary manner with the columns supporting and guiding the casing. The spindle is advanced by moving the entire casing in which the spindle is mounted axially and displaceably. The advancing movement of the casing is generated by the motor by means of a spindle nut drive. On the end face of the shaft is a tool receptacle, in which a processing tool can be mounted by means of a tool clamping device. For the automatic operation of the tool clamping device in the front part of the shaft clamping jaws are arranged which hold a tool. The clamping jaws are operated by means of a pull rod, whereby the tool is clamped by means of several disc springs, which are effective between the shaft and the pull rod. To release the clamping device the pull rod is displaced hydraulically against the force of the springs. The working spindle can be displaced a relatively large distance in the direction of its axis.

Working spindles known from DE 196 29 991 A1 comprise a shaft that is mounted rotatably in a casing. On the end face of the shaft there is generally a tool receptacle, in which by means of a tool-clamping device a processing tool can be mounted. The tool clamping device can be operated manually; however as a rule it is operated automatically. With these kinds of automatic tool clamping devices in the front part of the shaft clamping jaws are arranged for mounting a tool. The clamping jaws are operated by means of a pull rod, whereby the tool is clamped by means of one or more springs, which are effective between the shaft and the pull rod. To release the clamping device the pull rod is displaced hydraulically against the force of the spring.

Depending on the function of the machine tool the working spindle can reach every predetermined position in the working area of a machine tool. For this it is usual for the working spindle to be installed in a spindle slide, which can be moved in three coordinate directions, including parallel to the central longitudinal axis of the shaft. The working spindle together with the slide supporting it is relatively heavy.

It is also known to design the working spindle to be displaceable in only two axial directions, namely in a plane perpendicular to the central longitudinal axis of the shaft. The displacement in the direction of the central longitudinal axis is performed by displacing the workpiece to be processed in this direction. The workpiece is clamped in this case on a workpiece slide which is displaceable in the direction of the central longitudinal axis of the shaft. The disadvantage of this is that the workpiece slide together with the workpiece forms an extraordinarily heavy system, which has to be adjusted for each processing stage, thereby taking up time and energy.

SUMMARY OF THE INVENTION

The underlying objective of the invention is to construct a working spindle which is designed to be very light yet stable for short operating strokes.

This objective is achieved according to the invention by a spindle advancing drive being arranged in the casing and being coupled to the shaft, and by the shaft being mounted in the casing for displacement by a working stroke $c_{max}$ in the direction of the central longitudinal axis. The core of the invention is that the shaft supporting the receptacle, generally the tool receptacle, is arranged itself to be displaceable by means of a spindle advancing drive in the casing of the working spindle generally forming a tool spindle, and wherein generically also the spindle rotary drive is arranged in said casing. The entire unit is very compact and light. Only some of the drives have to be designed to be displaceable with the shaft. The parts arranged securely in the casing are non-displaceable.

Further features, advantages and details of the invention are given in the following description of exemplary embodiments with reference to the drawing.

DESCRIPTION OF THE PREFERRED EMBODIMENTS

Figure 1A:
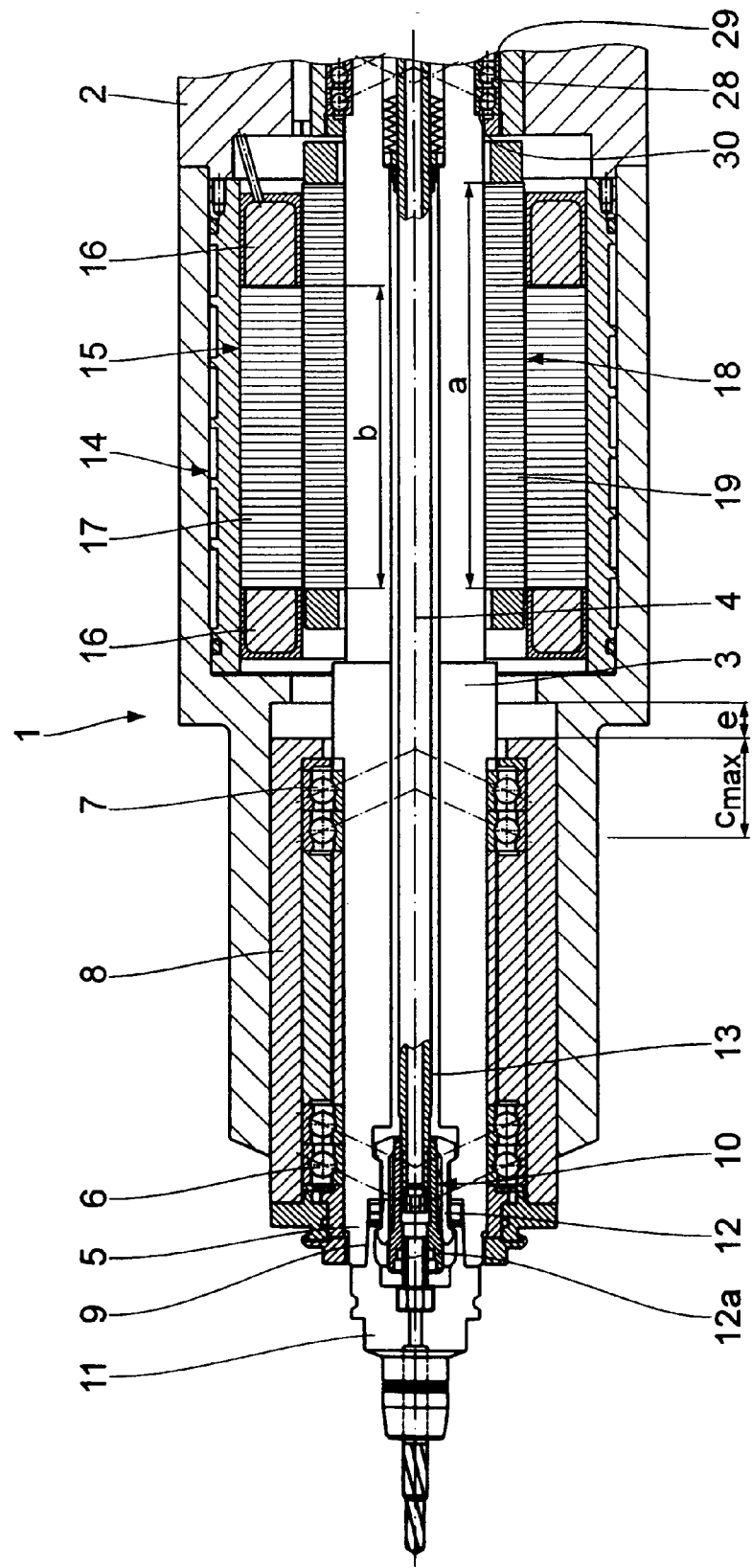
FIG. 1a shows the front part of a tool spindle according to the invention.
Figure 1B:
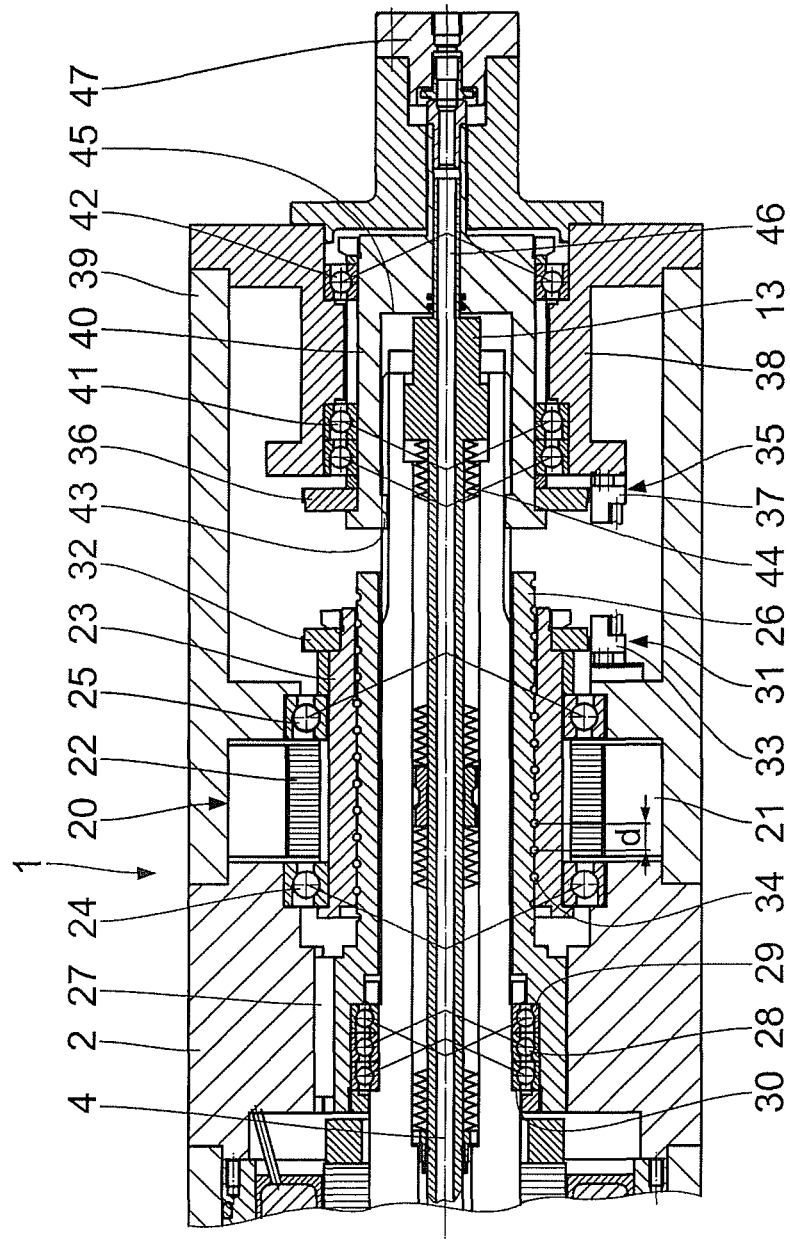
FIG. 1b shows the rear part of the tool spindle.

The working spindle shown in FIGS. 1a and 1b is a motor-driven tool spindle 1, which comprises a casing 2, in which a shaft 3 is arranged and is mounted to be rotary driven about a central longitudinal axis 4. The shaft 3 is mounted at its front end 5 by two roller bearings 6, 7 in a sliding sleeve 8 which is supported axially displaceably in the casing 2. The sliding sleeve 8 is guided displaceably like a sliding bearing in the casing 2. Of course, the support and guiding of the sleeve 8 in the casing 2 can also be performed by means of a conventional guiding element, for example a spherical sleeve.

At the end face of the shaft 3, i.e. at its front end 5 a tool receptacle 9 is arranged in which by means of a tool clamping device 10 a tool can be securely clamped. The clamping device 10 comprises clamping jaws 12, which can be spread by means of a clamping bolt 12a. The clamping bolt 12a can be activated by means of a pull rod 13 passing though the shaft 3 coaxially. Such clamping devices 10 are common in practice and known for example from DE 196 29 991 A1. Usually such a pull rod 13 is loaded by a preloaded spring away from the tool receptacle 9, whereby the tool 11 is held securely by the clamping jaws 12 in the tool receptacle 9. To release the clamping jaws 12 for the purpose of changing the tool the pull rod 13 is displaced in opposite direction, i.e. towards the tool receptacle 9, whereby by means of the clamping bolt 12a the clamping jaws 12 can be opened and the tool 11 can be removed.

In the casing 2 a spindle rotary drive 14 is also arranged, which may be an electric motor. A rotary drive stator 15 is fixed axially and tangentially, i.e. non-rotatably, in the casing 2. The rotary drive stator 15 is formed by a stack of stator laminations 17 and stator windings 16. A rotary drive rotor 18 of the drive 14 is attached non-rotatably on the shaft 3. The rotary drive rotor 18 is formed by a stack of rotor laminations 19 that have a length a, whereas the stator laminations 17 have a length b in the direction of the axis 4. As shown, a is substantially greater than b, and a–b corresponds approximately to the maximum operating stroke $c_{max}$ of the shaft 3 in the direction of the axis 4 relative to the casing 2. In this embodiment, the operating efficiency of the shaft 3, i.e. the tool spindle 1, is substantially the same in all possible axial positions of the shaft 3 relative to the casing 2.

Behind the spindle rotary drive 14 a spindle advancing drive 20 is provided in the casing 2. The spindle advancing drive 20 may be designed as a so-called torque motor. A spindle advancing stator 21 is fixed axially and tangentially, i.e. non-displaceably and non-rotatably, in the casing 2. A spindle advancing rotor 22 is connected securely with a ball-threaded nut 23 arranged therein, which is rotatable by means of roller bearings 24, 25, but mounted axially non-displaceably in the casing 2. In the ball threaded nut 23 a ball threaded sleeve 26 is arranged, which can be mounted to be displaceable relative to the casing 2 in the direction of the axis 4 but is nonrotatable. In tangential direction the sleeve 26 is secured by a guiding element 27, which can be designed in the form of a spring-groove-connection. Said guiding element 27 allows displacements of the sleeve 26 in the direction of the axis 4 opposite the casing 2. The ball threaded sleeve 26 is rotatable via roller bearings 28 relative to the shaft 3, but is supported non-displaceably, whereby the outer rings 29 of the roller bearings 28 are secured in the ball threaded sleeve 26, whilst the inner rings 30 are secured onto the shaft 3. With a rotation of the ball threaded nut 23 caused by the spindle advancing drive 20 the ball threaded sleeve 26 is displaced with the shaft 3 in the direction of the axis 4. The shaft 3 however is freely rotatable in the ball threaded sleeve 26.

Figure 2:
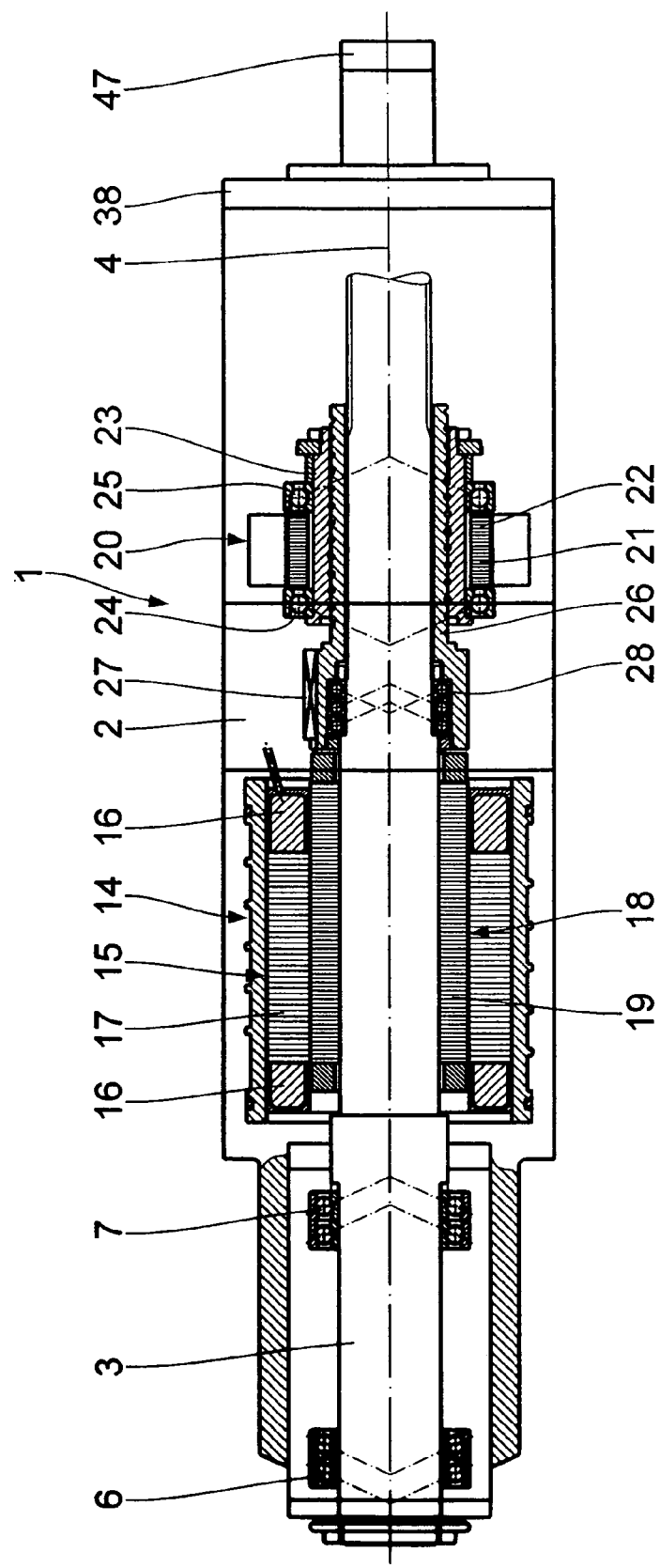
FIG. 2 shows a schematic view of the tool spindle with a retracted shaft.
Figure 3:
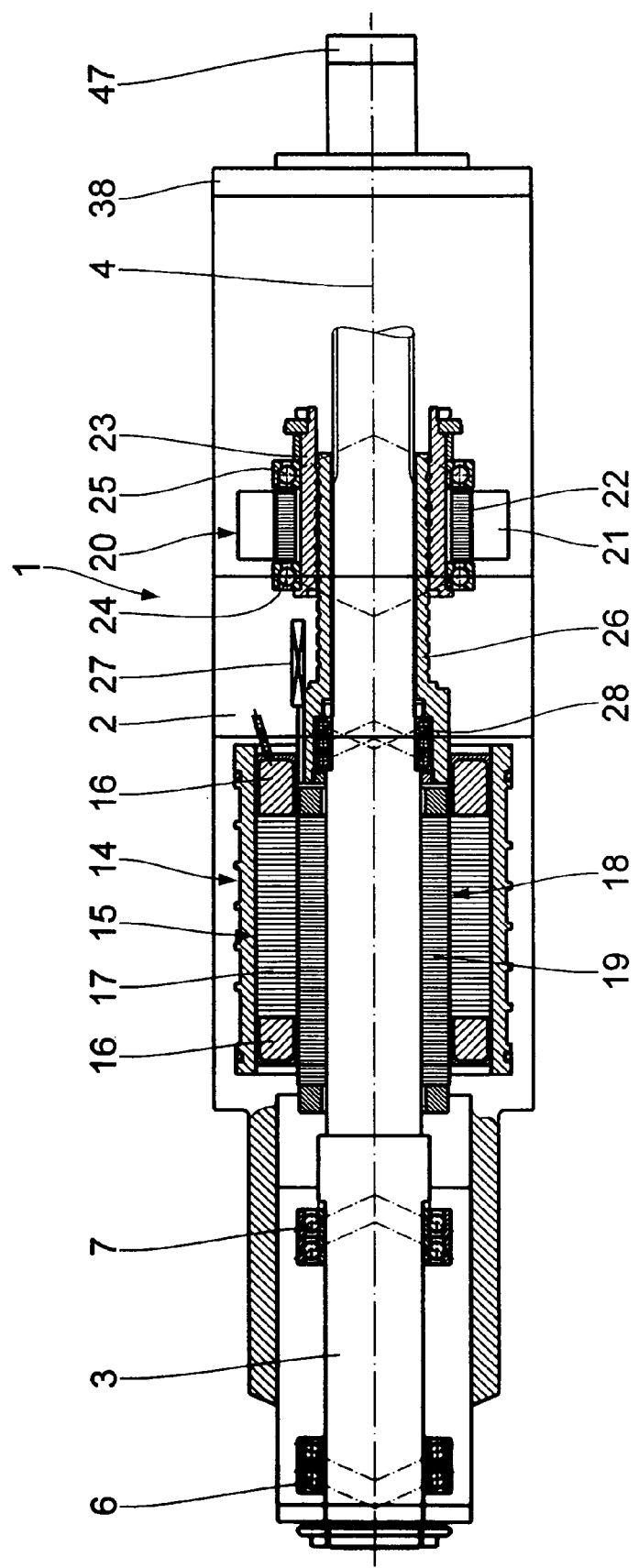
FIG. 3 shows a schematic view according to FIG. 2 of the tool spindle with an extended shaft.

FIG. 2 shows the shaft 3 in a position retracted as far as possible into the casing 2, whereas FIG. 3 shows the furthest possible extended position. This is the maximum operating stroke $c_{max}$, and $c_{max}$ is approximately equal to a–b.

Furthermore, a first measuring device comprising an axial feed measuring device 31 is provided which comprises a first measuring wheel 32 connected non-rotatably with the ball threaded nut 23 and an inductively operating a first measuring sensor 33 fixed in the casing 2. Upon rotation of the first measuring wheel 32 relative to the first measuring sensor 33 for example 256 signals or impulses are triggered. As the ball threaded sleeve 26 is displaced with the shaft 3 on the rotation of the ball threaded nut 23 by an amount d in the direction of the axis 4, which corresponds to the pitch of the thread 34 of the nut 23 and sleeve 26, the completed advance of the shaft 3 and thus the tool 11 and its position relative to the retracted position shown in FIG. 2 can be determined very precisely. The processing of the signals emitted by the device 31 is performed in a central processing unit (not shown) of the machine tool.

Furthermore, a second measuring device comprising a rotary measuring device 35 is provided, by means of which the rotary movement of the shaft 3 is determined. It comprises a second measuring wheel 36 rotating with the shaft 3 and a second measuring sensor 37 that is mounted in the casing 2.

The second measuring sensor 37 is attached to a sleeve-like insert 38, which is secured to the rear end 39 of the casing 2 so that the axial position of the second measuring wheel 36 relative to the second measuring sensor 37 does not change upon axial displacement of the shaft 3 by the spindle advancing drive 20. The second measuring wheel 36 is attached to a pot-shaped sleeve 40 surrounding the shaft 3, which is freely rotatable via roller bearings 41, 42 in the insert 38, but is mounted non-displaceably in the direction of the axis 4. The second measuring wheel 36 is connected with the shaft 3 by means of a slide connection 43, for example a longitudinal toothing or the like, so that the shaft 3 can be displaced axially relative to the sleeve 40. The processing of the signals generated in the rotary measuring device 35 is performed in principally the same manner as for the axial advance measuring device 31. The measuring devices 31, 35 are known in their basic function in other fields of technology.

As already mentioned, the pull rod 13 is pulled or clamped by means of a preloaded spring or a spring package 44 from the front end 5 of the shaft 3 to the rear end 39, whereby the tool clamping device 10 is closed. The spring package 44 is supported on the one hand against the shaft 3 and on the other hand against the pull rod 13. To release the tool clamping device 10, instead of the otherwise usual hydraulic cylinder, pneumatic cylinder or another mechanical operating unit, the spindle advancing drive 20 can be used. In this case the shaft 3 with the pull rod 13 is displaced in the direction of the rear end 39 of the casing 2 through a release stroke e indicated in FIG. 1a, until the pull rod 13 displaced by the shaft 3 hits the end wall or base 45 of the pot-shaped sleeve 40, which is held in the direction of the axis 4 non-displaceably in the casing 2. When the pull rod 13 hits the base 45 the pull rod 13 is secured in the direction of the axis 4, whilst the shaft 3 is moved further in the direction of the base 45 of the pot-like sleeve 40. The pull rod 13 is thus displaced relative to the shaft 3 towards its front end 5, whereby the clamping jaws 12 of the tool clamping device 10 are opened so that the tool 11 can be removed. This type of opening of the tool receptacle 9 requires special means for handling the tool 11, as during the release process the tool executes an axial movement. By measuring the electrical currents in the spindle advancing drive 20 the release process can be monitored. In this way it is also possible to avoid any additional monitoring of the tool clamping, i.e. it can also be determined whether the tool 11 is held correctly in the clamping device 10.

In conclusion, it should be noted that the pull rod 13 is designed in the usual manner to be hollow, i.e. has an inner canal 46 through which cooling-lubricating medium is conveyed in the direction of the tool receptacle 11. For this function, a rotary feeder 47 is provided at the rear end 39 of the casing 2 by means of which the cooling lubricant is feed into the inner canal 46 and is conveyed in the direction of the front end 5 of the shaft 3. From that location the cooling lubricant is conveyed in the usual manner via distribution canals (not shown) to the tool 11.

The invention claimed is:

1. A motor-driven working spindle for a machine tool comprising:
    a casing with a central longitudinal axis extending from a front of the spindle to the rear of the spindle;
    a shaft mounted for rotation in the casing;
    a receptacle arranged on a front end of the shaft, in which receptacle, by means of a clamping device, a machining tool is releasably clampable;
    a pull rod mounted for displacement in the shaft, whereby the clamping device may be actuated by the pull rod;

a spindle advancing drive coupled to the shaft and positioned in the casing; wherein the shaft is mounted in the casing for displacement by the spindle advancing drive through a working stroke in the direction of the central longitudinal axis;

an end wall positioned in the casing, wherein the pull rod may be seated against the end wall by moving the pull rod in the direction of the central longitudinal axis; and wherein the shaft is displaceable, by means of the spindle advancing drive, relative to the pull rod that is seated against the end wall, for releasing the clamping device;

an electromotive spindle rotary drive coupled to the shaft and arranged in the casing, the spindle rotary drive comprising;

a rotary drive stator and a rotary drive rotor,
wherein the rotary drive stator surrounds the shaft and is mounted in the casing;

and wherein the rotary drive rotor is fastened to the shaft; and, wherein the spindle advancing drive is to the rear of the rotary drive, and the end wall is to the rear of the spindle advancing drive.

2. A working spindle according to claim 1 further comprising:

the spindle advancing drive comprising a spindle advancing stator mounted in the casing and a spindle advancing rotor;

a threaded nut coupled to the spindle advancing rotor, the threaded nut being rotationally mounted in the casing and non-displaceable in the direction of the central longitudinal axis; and a threaded sleeve coupled to the threaded nut, the threaded sleeve being axially displaceable but rotationally fixed on the shaft.

3. A working spindle according to claim 2 further comprising: a torque motor comprising the spindle advancing drive.

4. A working spindle according to claim 1 further comprising:

a stack of rotor laminations with a length a in the direction of the central longitudinal axis comprising the rotary drive rotor of the spindle rotary drive; and a stack of stator laminations with a length b comprising the rotary drive stator of the spindle rotary drive; wherein a is substantially greater than b.

5. A working spindle according to claim 4,
wherein a maximum value of the working stroke of the shaft is approximately equal to a−b.

6. A working spindle according to claim 1 further comprising:

a sliding sleeve mounted in the casing,
wherein the shaft is mounted in the casing by means of the sliding sleeve.

7. A working spindle according to claim 1 further comprising:

a spring positioned between the shaft and the pull rod, the spring being arranged for clamping the clamping device.

8. A working spindle according to claim 1 further comprising:

a first measuring device for measuring the axial position of the shaft.

9. A working spindle according to claim 1 further comprising:

a second measuring device for measuring the rotary position of the shaft.

* * * * *